US009329348B2

(12) United States Patent
Hofrichter et al.

(10) Patent No.: US 9,329,348 B2
(45) Date of Patent: May 3, 2016

(54) ARRANGEMENT OF PHOTONIC CHIP AND OPTICAL ADAPTOR FOR COUPLING OPTICAL SIGNALS

(71) Applicant: International Business Machines Corporation, Armonk, NY (US)

(72) Inventors: Jens Hofrichter, Rueschlikon (CH); Folkert Horst, Rueschlikon (CH); Antonio La Porta, Rueschlikon (CH); Bert J. Offrein, Rueschlikon (CH); Ibrahim Murat Soganci, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 14/017,610

(22) Filed: Sep. 4, 2013

(65) Prior Publication Data

US 2014/0093207 A1    Apr. 3, 2014

(30) Foreign Application Priority Data

Sep. 28, 2012 (GB) .................................. 1217383.7

(51) Int. Cl.
*G02B 6/36* (2006.01)
*G02B 6/42* (2006.01)

(52) U.S. Cl.
CPC .............. *G02B 6/4234* (2013.01); *G02B 6/423* (2013.01); *G02B 6/4204* (2013.01); *G02B 6/425* (2013.01)

(58) Field of Classification Search
None
See application file for complete search history.

(56) References Cited

U.S. PATENT DOCUMENTS

| 5,071,213 | A | 12/1991 | Chan |
| 5,179,609 | A | 1/1993 | Blonder et al. |
| 5,854,867 | A | 12/1998 | Lee et al. |
| 5,879,571 | A | 3/1999 | Kalman et al. |
| 5,959,315 | A | 9/1999 | Lebby et al. |
| 6,095,697 | A | 8/2000 | Lehman et al. |
| 6,115,521 | A | 9/2000 | Tran et al. |
| 6,272,272 | B1 | 8/2001 | Ford |
| 6,584,250 | B2 | 6/2003 | Lin et al. |
| 6,654,524 | B2 | 11/2003 | Shekel et al. |

(Continued)

FOREIGN PATENT DOCUMENTS

| CN | 1209203 A | 2/1999 |
| CN | 101180562 A | 5/2008 |

(Continued)

OTHER PUBLICATIONS

GB Intellectual Property Office; Application No. GB1217385.2; Date Mailed: Jan. 29, 2013; Patents Act 1977: Search Report Under Section 17(5); pp. 1-3.

(Continued)

*Primary Examiner* — Hemang Sanghavi
(74) *Attorney, Agent, or Firm* — Cantor Colburn LLP

(57) ABSTRACT

An apparatus includes an optical adaptor having monolithically integrated optical elements and first micro-mechanical features, the latter defining at least a first horizontal reference surface and a first vertical reference surface; wherein the first horizontal reference surface is perpendicular to an optical plane, the latter being perpendicular the optical axis of the optical elements; and wherein the first vertical reference surface is perpendicular to the first horizontal reference surface and parallel to the optical axis.

5 Claims, 4 Drawing Sheets

(56) References Cited

U.S. PATENT DOCUMENTS

| | | |
|---|---|---|
| 6,865,321 B2 | 3/2005 | Tella et al. |
| 6,904,190 B2 | 6/2005 | Korenaga et al. |
| 7,027,677 B2 | 4/2006 | Li et al. |
| 7,099,534 B2 | 8/2006 | Kato et al. |
| 7,184,646 B2 | 2/2007 | Velsher |
| 7,236,666 B2 | 6/2007 | George et al. |
| 7,267,930 B2 | 9/2007 | Payne |
| 7,275,877 B2 | 10/2007 | Go |
| 7,298,941 B2 | 11/2007 | Palen et al. |
| 7,366,375 B2 | 4/2008 | Ohtorii |
| 7,369,724 B2 | 5/2008 | Deane |
| 7,373,033 B2 | 5/2008 | Lu et al. |
| 7,415,184 B2 | 8/2008 | Ghiron et al. |
| 7,428,351 B2 | 9/2008 | Jenkins et al. |
| 7,477,816 B2 | 1/2009 | Juni |
| 7,547,148 B2 | 6/2009 | Ikunishi |
| 7,676,131 B2 | 3/2010 | Luo |
| 7,853,105 B2 | 12/2010 | Budd et al. |
| 8,554,026 B2 | 10/2013 | Chang et al. |
| 9,046,662 B2 | 6/2015 | Hung |
| 2002/0028046 A1 | 3/2002 | Delprat |
| 2003/0012508 A1 | 1/2003 | Westmarland et al. |
| 2003/0031409 A1 | 2/2003 | Bellman et al. |
| 2003/0146187 A1* | 8/2003 | Sasaki ................ G02B 6/4204 216/24 |
| 2006/0120673 A1 | 6/2006 | Morlion et al. |
| 2006/0164738 A1 | 7/2006 | Yamamoto et al. |
| 2006/0239605 A1 | 10/2006 | Palen et al. |
| 2007/0058904 A1 | 3/2007 | Ban et al. |
| 2007/0267569 A1 | 11/2007 | Ueno et al. |
| 2008/0008419 A1 | 1/2008 | Krahenbuhl et al. |
| 2008/0144999 A1 | 6/2008 | Takeda et al. |
| 2009/0162004 A1 | 6/2009 | Johnson et al. |
| 2010/0220318 A1 | 9/2010 | Moll et al. |
| 2011/0013866 A1 | 1/2011 | Rosenberg et al. |
| 2011/0013869 A1 | 1/2011 | Pezeshki et al. |
| 2011/0164848 A1 | 7/2011 | Bolle |
| 2011/0222823 A1* | 9/2011 | Pitwon ................ G02B 6/42 385/93 |
| 2012/0114280 A1* | 5/2012 | Pitwon ................ G02B 6/4212 385/14 |
| 2013/0287406 A1* | 10/2013 | Huang ................ G02B 6/4292 398/139 |
| 2014/0050442 A1 | 2/2014 | Wurster et al. |
| 2014/0082935 A1* | 3/2014 | Gold ................ G02B 6/32 29/836 |
| 2014/0193124 A1 | 7/2014 | Bylander et al. |

FOREIGN PATENT DOCUMENTS

| | | |
|---|---|---|
| GB | 2439751 A | 1/2008 |
| JP | 2006235262 A | 9/2006 |

OTHER PUBLICATIONS

GB Intellectual Property Office; Application No. GB1217383.7; Patents Act 1977: Search Report Under Section 17(5); Date Mailed: Jan. 29, 2013; pp. 1-5.

\* cited by examiner

ARRANGEMENT OF PHOTONIC CHIP AND OPTICAL ADAPTOR FOR COUPLING OPTICAL SIGNALS

PRIORITY

This application claims priority to Great Britain Patent Application No. 1217383.7, filed Sep. 28, 2012, and all the benefits accruing therefrom under 35 U.S.C. §119, the contents of which in its entirety are herein incorporated by reference.

BACKGROUND

The present invention relates to the field of aligning optical components, notably optical coupling elements, to optical waveguides.

A high optical coupling efficiency between a photonic chip—or photonic integrated circuit (PIC)—and an optical element is a key requirement in the optical industry. Positioning errors may lead to sub-optimal coupling and therefore to optical loss which impair the overall system performances.

U.S. Pat. No. 7,415,184 discloses an arrangement for providing optical coupling into and out of a relatively thin silicon waveguide, formed in the SOI (silicon-on-insulator) layer of a SOI layer stack and including a lens element and one defined reference surface within the SOI layer stack for providing optical coupling. However, no passive lateral coupling can be realized because no vertical reference surfaces are available. Thus, a need remains in art for an efficient arrangement for coupling optical signals between waveguides and another optical element.

SUMMARY

In one embodiment, an apparatus includes an optical adaptor having monolithically integrated optical elements and first micro-mechanical features, the latter defining at least a first horizontal reference surface and a first vertical reference surface; wherein the first horizontal reference surface is perpendicular to an optical plane, the latter being perpendicular the optical axis of the optical elements; and wherein the first vertical reference surface is perpendicular to the first horizontal reference surface and parallel to the optical axis.

In another embodiment, a system for coupling optical signals includes an optical adaptor having monolithically integrated optical elements and first micro-mechanical features, the latter defining at least a first horizontal reference surface and a first vertical reference surface, wherein the first horizontal reference surface is perpendicular to an optical plane, the latter being perpendicular the optical axis of the optical elements, and the first vertical reference surface is perpendicular to the first horizontal reference surface and parallel to the optical axis; and a photonic chip, comprising waveguides having waveguide terminations at a trench of the photonic chip, and second micro-mechanical features defining at least a second horizontal reference surface and a second vertical reference surface; wherein the second horizontal reference surface is perpendicular to a second optical plane, the latter being perpendicular to a second optical axis of the waveguides, the second vertical reference surface is perpendicular to the second horizontal reference surface and parallel to the second optical axis, the first horizontal reference surface is in contact with the second horizontal reference surface and the first vertical reference surface is in contact with the second vertical reference surface.

In another embodiment, a method is disclosed for aligning optical elements of an optical adaptor according to with waveguides of a photonic chip, the optical adaptor monolithically integrating optical elements and first micro-mechanical features, the latter defining at least a first horizontal reference surface and a first vertical reference surface, wherein the first horizontal reference surface is perpendicular to an optical plane, the latter being perpendicular the optical axis of the optical elements, and the first vertical reference surface is perpendicular to the first horizontal reference surface and parallel to the optical axis. The method includes putting in contact the first horizontal reference surface and the first vertical reference surface with corresponding second horizontal surface and second vertical surface of the photonic chip.

BRIEF DESCRIPTION OF THE SEVERAL VIEWS OF THE DRAWINGS

The above and other aspects of the features of the present invention will become readily apparent from the detailed description that follows, with reference to accompanying drawings, in which.

Figure 1:
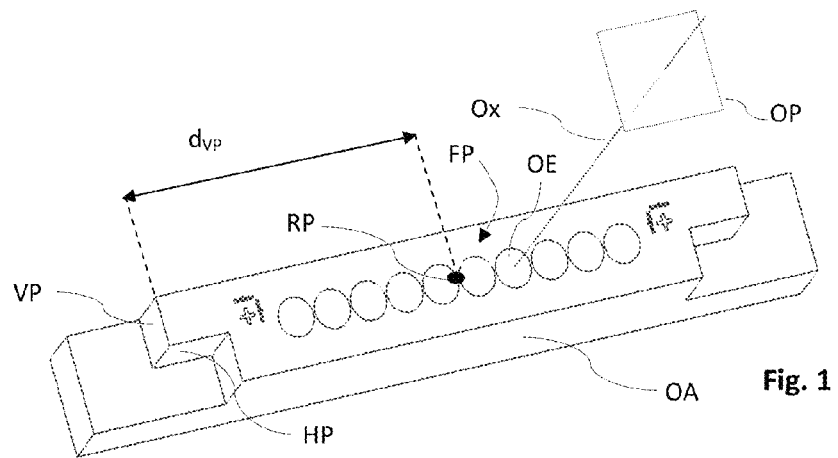
FIG. 1 illustrates an optical adaptor OA according to embodiments of the invention.

Most features visible in the appended drawings are meant to be to scale.

DETAILED DESCRIPTION

According to a first aspect, the invention can be embodied as an optical adaptor monolithically integrating optical elements and first micro-mechanical features, the latter defining at least a first horizontal reference surface and a first vertical reference surface, wherein, the first horizontal reference surface is perpendicular to an optical plane, the latter being perpendicular to the optical axis of the optical elements; and the first vertical reference surface is perpendicular to the first horizontal reference surface and parallel to the optical axis. In other words, the three reference surfaces defined above, i.e., the first horizontal reference surface, the first vertical reference surface and the optical plane, are perpendicular two by two. Accordingly, the optical elements can be aligned with waveguides of a photonic chip upon contacting the first horizontal reference surface and the first vertical reference surface with corresponding second horizontal surface and second vertical surface of the photonic chip.

In embodiments of the invention, the optical adapter may comprise one or more of the following features: the optical elements comprise a lens array, the optical plane being perpendicular to optical axes of the lens array; the optical elements comprise at least two groups of optical elements of distinct types; at least one group of optical element comprises a mirror.

According to another aspect, the invention can be embodied as an arrangement for coupling optical signals comprising an optical adaptor as previously defined and a photonic chip, the photonic chip comprising: waveguides having waveguide terminations at a trench of the photonic chip; and second micro-mechanical features defining at least a second horizontal reference surface; and a second vertical reference surface, wherein the second horizontal reference surface is perpendicular to a second optical plane, the latter being perpendicular to a second optical axis of the waveguides, the second vertical reference surface is perpendicular to the second horizontal reference surface and parallel to the second optical axis, the first horizontal reference surface is in contact with the second horizontal reference surface and the first vertical reference surface is in contact with the second vertical reference surface.

In embodiments, the arrangement may comprise one or more of the following features: the photonic chip is according to silicon on insulator technology; a first distance between the first horizontal reference surface and a reference point associated with the optical element is equal to a second distance between the second horizontal reference surface and a corresponding reference point associated with the waveguide, and a third distance between the first vertical reference surface and the reference point is equal to a fourth distance between the second vertical reference surface and the corresponding reference point. Both the first distance and the second distance are equal to zero.

According to another aspect, the invention can be embodied as a method for aligning optical elements of an optical adaptor as previously defined with waveguides of a photonic chip, the method including putting in contact the first horizontal reference surface and the first vertical reference surface with corresponding second horizontal surface and second vertical surface of the photonic chip.

In embodiments, the method may comprise one or more of the following features: putting in contact the first horizontal reference surface with the second horizontal reference surface; and putting in contact the first vertical reference surface with the second vertical reference surface. The photonic chip is fabricated according to silicon on insulator technology, whereby a silicon on insulator layer stack is obtained. The second micro-mechanical features are fabricated by etching processes selectively ending at interfaces between surfaces of the silicon on insulator layer stack. Putting in contact comprises setting the first distance equal to the second distance, preferably equal to zero, and the third distance equal to the fourth distance.

According to yet another aspect, the invention can be embodied as a method of fabrication of an optical adapter as described above. In embodiments, the optical element and the first micro-mechanical features are obtained through wafer-level processing.

As an introduction of the following description, it is first pointed at a general aspect of the invention, which concerns a method for aligning optical elements of an optical adaptor with waveguides of a photonic chip.

The optical adaptor monolithically integrates optical elements and first micro-mechanical features defining at least a first horizontal reference surface and a first vertical reference surface. The first horizontal reference surface is perpendicular to an optical plane, which is itself perpendicular to (and defined by) the optical axis of the optical elements, and the first vertical reference surface is perpendicular to the first horizontal reference surface (and parallel to the optical axis). The second horizontal reference surface is perpendicular to a second optical plane, which is itself perpendicular to (and defined by) a second optical axis, i.e., the optical axis of the waveguides. The second vertical reference surface is perpendicular to the second horizontal reference surface and parallel to this second optical axis.

The method includes putting in contact the first horizontal reference surface with the second horizontal reference surface and putting in contact the first vertical reference surface with the second vertical reference surface. The photonic chip may have waveguide terminations at a trench thereof and second micro-mechanical features defining at least a second horizontal reference surface and a second vertical reference surface.

FIG. 1 illustrates an optical adaptor OA according to embodiments. This optical adaptor OA monolithically integrates optical elements OE, e.g., lenses, and micro-mechanical features which define at least two reference surfaces VP, HP perpendicular to each other. A reference surface HP is horizontal, i.e., perpendicular to the optical plane OP defined by the optical axis Ox of the optical elements OE. This optical plane is by definition perpendicular to this optical axis. In FIG. 1, the optical plane is actually represented by a plane segment OP that is otherwise parallel to a front pane FP of the adapter OA, which front pane FP supports the optical elements OE. Another reference surface VP is vertical, i.e., perpendicular to the horizontal surface HP. It is also parallel to the optical axis (i.e., the optical axis does not intersect the plane defined by the vertical reference surface VP).

The optical elements OE may for instance comprise a lens array, as in the embodiment of FIG. 1, but other types of optical elements may also be used, like deflectors, fibers, etc. More generally, the optical elements shall preferably form a group of individual optical elements. In embodiments, the optical elements OE comprise at least two groups of optical elements. These groups can be of the same type or of different types, for instance the optical elements can comprise a group comprising lenses, and another group comprising a mirror.

As discussed above, the micro-mechanical features (and the reference planes they define) are specifically positioned with respect to the optical elements OE. The optical elements can for instance be associated to a reference point RP, e.g., the center of the optical elements OE. The micro-mechanical features (and the reference surfaces VP, HP they define) can thus be regarded as being specifically positioned with respect to this reference point.

More in detail, the relative position of the micro-mechanical features with regard to the optical elements can be defined by a set of geometrical parameters. In the embodiment of FIG. 1, these parameters include: a distance $d_{VP}$, which corresponds to the distance between the vertical surface VP and the reference point RP; and a distance between the horizontal surface HP and the reference point RP.

In the example of FIG. 1, the horizontal surface HP is aligned with the reference point RP (i.e., the reference point is within the plane defined by the horizontal surface). The distance is then equal to zero. In other embodiments, the distance may be different to zero and the horizontal surface can be at a small offset of the parallel plane comprising the reference point RP. Other shapes of the optical adapter OA may lead to determine other geometrical parameters defining the relative position of the micro-mechanical features with regard to the optical elements OE. This allows the reference surfaces being adapted so that when put in contact with corresponding reference planes of a photonic chip, the optical elements OE are aligned with the waveguides WG comprised in this photonic chip. This will be made clearer later in the description that follows.

Figure 2A:
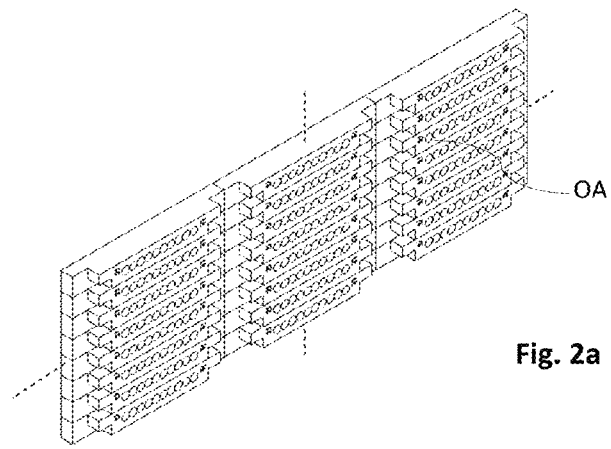
FIGS. 2a and 2b illustrate a fabrication process of an optical adaptor according to embodiments.
Figure 2B:
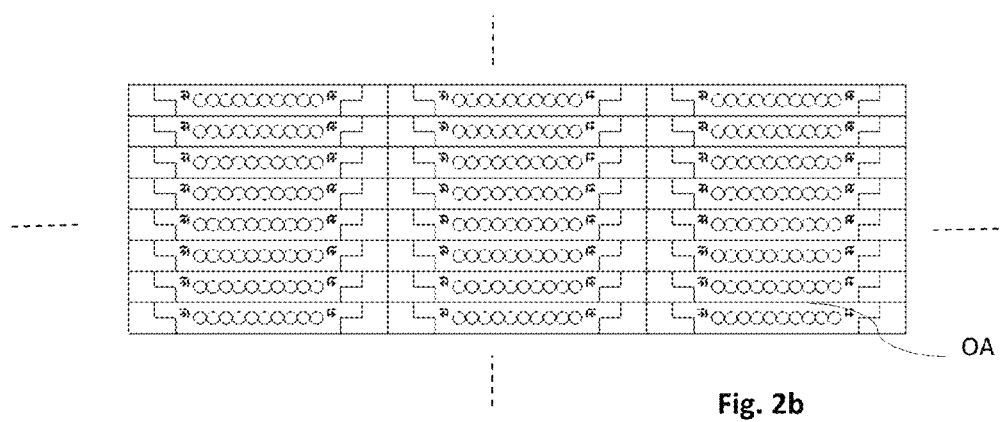

FIGS. 2a and 2b illustrate the fabrication process of an optical adaptor according to this embodiment of the invention. FIG. 2a shows a bird's eye view and FIG. 2b shows a front view of the optical adapter OA after fabrication. In this embodiment, both the lens array OE and the micro-mechanical features can be obtained through wafer-level processing, preferably through etching process on a wafer surface.

The figures show an array of 3×8 optical adapters OA, but much more optical elements can be fabricated on a same process, as suggested by the dotted lines in FIG. 2a and FIG. 2b. With such a technique, the micro-mechanical features and the optical elements OE can be lithographically positioned with regard to each other. This enables to reach a relative positioning accuracy less than 500 nm in the lateral and vertical directions. Once fabricated, the optical adapters OA can be separated into individual units.

Figure 3:
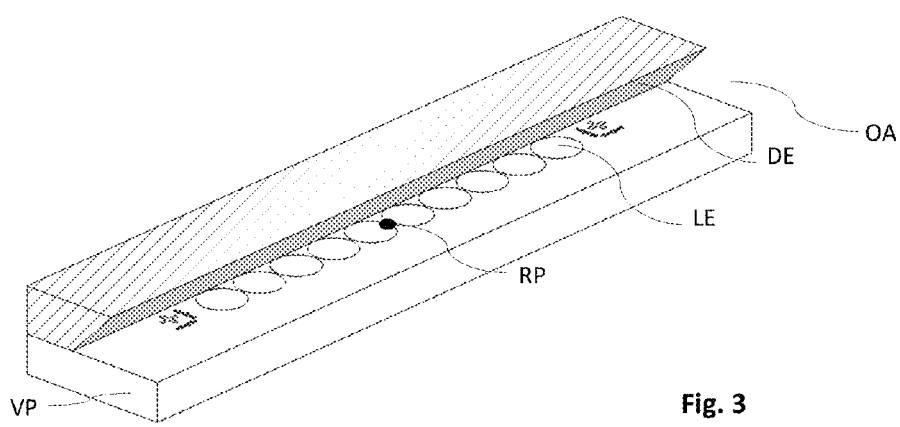
FIG. 3 depicts another embodiment of the optical adapter OA.

FIG. 3 depicts another embodiment of the optical adapter OA according to the invention. It also comprises optical elements OE. These optical elements comprise two groups. A first group is made of a plurality of optical lens LE, and another group is constituted by a deflecting element (or mirror) DE. A reference point RP is determined, for instance as being the center of the optical lens LE. With regard to this reference point RP, micro-mechanical features can be defined. These micro-mechanical features can for instance define a vertical surface VP and a horizontal surface (not depicted in FIG. 3) as being the hidden inferior face of the optical adaptor OA. In the present case the hidden inferior face corresponds to the "backside" of the optical lens array.

The optical adapted OA of this embodiment can be fabricated in a similar way as in previous embodiments. Similar accuracy can be reached for the relative positioning of the micro-mechanical features with regard to the optical elements OE. Such an optical adapter OA can perform an out-of-plane optical coupling, as to be described later in more detail.

Figure 4:
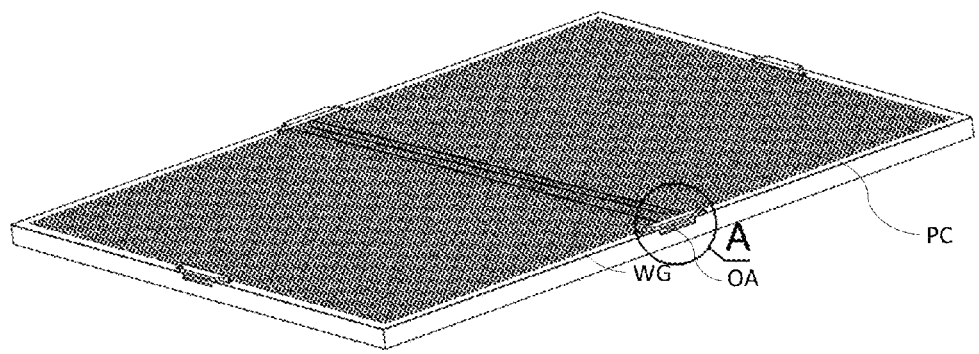
FIG. 4 depicts an arrangement according to embodiments.

FIG. 4 depicts an arrangement according to embodiments. This arrangement can comprise a photonic chip PC and an optical adapter OA. In accordance with an exemplary embodiment of the invention, the photonic chip may be according to silicon photonic chip in silicon-on-insulator (SOI) technology, so as to obtain a silicon on insulator layer stack. Silicon on insulator technology refers to the use of a layered silicon insulator/silicon substrate in place of conventional silicon substrates. In SOI-based devices, the silicon junction is above an electrical insulator, e.g., silicon dioxide or sapphire, or silicon-on-sapphire (SOS).

SOI wafers are widely used for silicon photonic devices. The crystalline silicon layer can be sandwiched between the buried insulator and top cladding (of air, silicon oxide and any other low refractive index material). This enables propagation of electromagnetic waves in the waveguides on the basis of total internal reflection.

The photonic chip PC comprises waveguides WG. These waveguides have terminations at a trench T of the photonic chip. In embodiments, a trench is formed at the edge to the photonic chip PC. An optical adapter OA can be inserted into the trench. The trench T can be etched within the photonic chip PC and the waveguides terminations can be formed at this trench T. In case the photonic chip is a silicon photonic chip in silicon-on-insulator (SOI) technology, the waveguides WG may be included within the SOI layer stack. In the example of FIG. 4, four trenches have been represented, each on a distinct side of the chip.

Figure 5A:
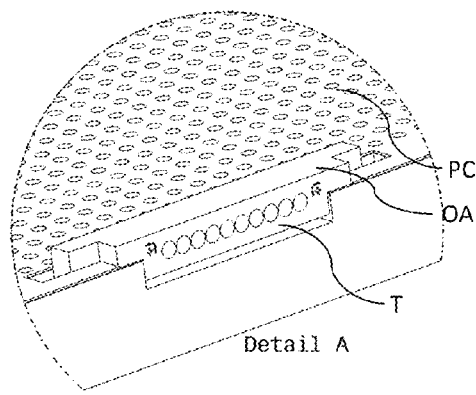
FIGS. 5a, 5b and 5c represent detailed views of a photonic chip according to embodiments.
Figure 5B:
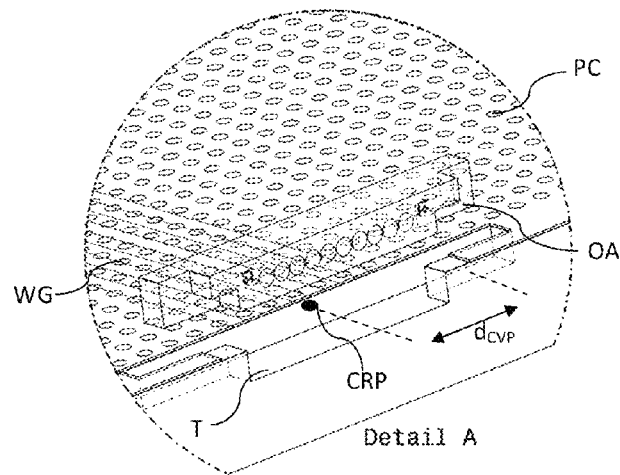

FIGS. 5a and 5b represent detailed views of the circular area labeled "A" in FIG. 4. In FIG. 5a, an optical adapter AO has been inserted into the trench T. The optical adapter OA can for instance be the same as described earlier in reference to FIG. 1. The trench T has a shape adapted to the optical adapter OA. It should allow the optical adapter OA to be inserted. For instance, the depth of the trench should be enough for the optical adapter OA to be inserted enough so that the optical elements OE can be positioned in front of the waveguides WG. As it will be seen later, it can be deeper, since the alignment of the optical adapter OA with regard to the photonic chip will be provided by micro-mechanical features of the photonic chip PC (and not by the depth of the trench T).

The waveguides are more apparent in FIG. 5b for instance, where the optical adapter OA has been removed. The terminations are formed at the end of the photonic chip, in the internal face of the trench T.

Figure 5C:
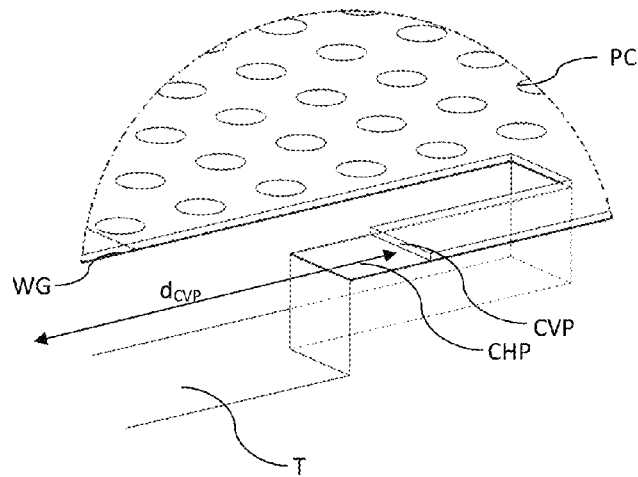

FIG. 5c shows a more detailed view of a part of the trench T and of micro-mechanical features comprised with the photonic chip PC. The micro-mechanical features define reference surfaces CHP, CVP. In this embodiment of the invention, a horizontal surface CHP and a vertical surface CVP are defined. The horizontal reference surface CHP is perpendicular to an optical plane defined by the optical axis of the waveguides WG. This optical plane is by definition perpendicular to this optical axis. The vertical reference surface CVP is perpendicular to this horizontal reference surface and parallel to the optical axis of the waveguides WG.

The horizontal surface CHP can for instance be obtained by an etching process of the SOI layer stack, e.g., the etching process selectively stops at the interface between subsequent layers of the SOI layer stack. The vertical surface CVP can notably be obtained using vertical etching process into the SOI layer stack, preferably into the back-end-of the line (BEOL) structure on top of the SOI layer stack. The micro-mechanical features are positioned with regard to waveguide terminations and, as a consequence, the reference surfaces CHP, CVP they define are positioned accordingly. The waveguides WG can be associated with a reference point CRP. This reference point can be the termination of the central waveguide among all the waveguides WG. The positioning of the micro-mechanical features (and the reference surfaces they define) can be made with respect to this reference point.

The relative position of the micro-mechanical features with regard to the optical elements OE is captured by a set of geometrical parameters. In the embodiment of FIG. 5c, these parameters comprise a distance $d_{CVP}$ between the vertical reference surface CVP and the reference point CRP, and a distance between the horizontal reference surface CHP and the reference point CRP.

The distance $d_{CVP}$ is depicted in FIG. 5b by a double-headed arrow, between the dotted lines: one dotted line denotes a prolongation of the central waveguide, the other dotted line being the prolongation of the horizontal and vertical reference surfaces CHP, CVP respectively. Both distances are determined such that the optical elements OE are aligned with the waveguides WG when the optical adapter OA is positioned on the photonic chip PC. The accuracy that can be achieved in the positioning of the horizontal surface CHP, which is determined by the accuracy of the vertical position of the waveguides into the SOI layer-stack, can be less, i.e., better than 10 nm. The accuracy of the positioning of the vertical surface CVP can be less than 500 nm, e.g., in embodiments where the horizontal position of the BEOL wall (with respect to the waveguide position) is lithographically defined.

Referring back to FIG. 5a, it will be seen how the micro-mechanical features of the optical adaptor OA and of the photonic chip PC defines reference surfaces HP, VP, CHP, CVP enabling lateral and vertical alignment of the optical adaptor and of the photonic chip so that the waveguides WG can be aligned with the optical elements OE. This enables optical in-plane coupling of the waveguides WG with the optical elements OE.

More precisely, in this embodiment, the horizontal surface HP of the optical adapter OA is put in contact with the horizontal surface CHP of the photonic chip PC. This aligns the optical elements OE of the optical adapter OA with the waveguides WG according to the elevation axis. The vertical surface VP of the optical adapter OA is put in contact with the vertical surface CVP of the photonic chip PC. This aligns the optical elements OE of the optical adapter OA with the waveguides WG according to the horizontal axis, perpendicular to the optical axis.

In this embodiment, putting in contact the reference surfaces may comprise setting the previously-defined distances so that: a first distance, which is the distance between the horizontal reference surface HP and the reference point RP associated with the optical elements, is equal to a second distance, which is the distance between the second horizontal reference surface CHP and the corresponding reference point CRP associated with the waveguide WG, and a third distance, i.e., the distance $d_{VP}$ between the vertical reference surface VP and the reference point RP is equal to the distance $d_{CVP}$ between the second vertical reference surface CVP and the corresponding reference point CRP.

Note that the first and second distances (e.g., equal) are determined by the distance between the center of the waveguide and the upper surface of the buried oxide (BOX) layer in the SOI layer stack. This distance depends on the height itself of the silicon waveguide. Typical distances are about 220 nm/2=110 nm. More generally, the distances can be a few hundreds of nanometer (but preferably less than 1000 nm).

The third ($d_{vp}$) and fourth ($d_{cvp}$) distances (e.g., equal) depend on the number of waveguides and the pitch. For instance, FIG. 5 represents 10 waveguides with a pitch of 125 μm. Thus, the distances approximately correspond to 9×125 μm/2+60 μm (radius of a lens)+100 μm (clearance lens-to-feature)+100 μm of the HP extension=822.5 μm. Roughly, for 10 waveguides with 125 μm pitch, the distances are approximately equal to 1 mm. Yet, one understands that even moderate variations in the previous parameters may result in distances between 0.5 and 2 mm. Of course, depending on the number of waveguides and the pitch, still other ranges of distances could be obtained.

Next, the area of the horizontal surfaces HP (and correspondingly the CHP) is preferably on the order of 100 μm×200 μm. The area of the vertical surfaces VP (and correspondingly the CVP) is preferably on the order of 15 μm×200 μm. More generally, each of the above areas can be measured as a×b, where each of a and b is typically between 15 and 500 μm.

Figure 6A:
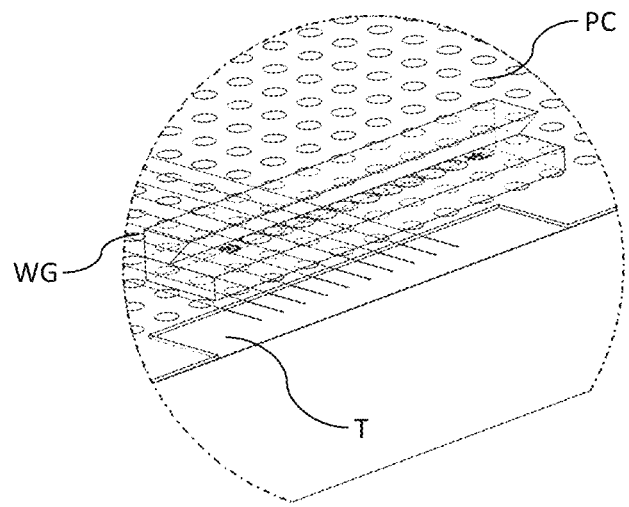
FIGS. 6a, 6b and 6c represent detailed views of a photonic chip according to another embodiment of the invention.
Figure 6B:
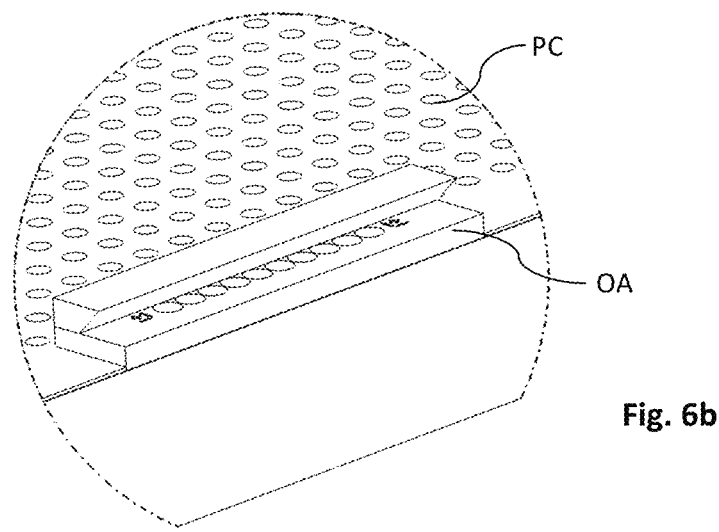
Figure 6C:
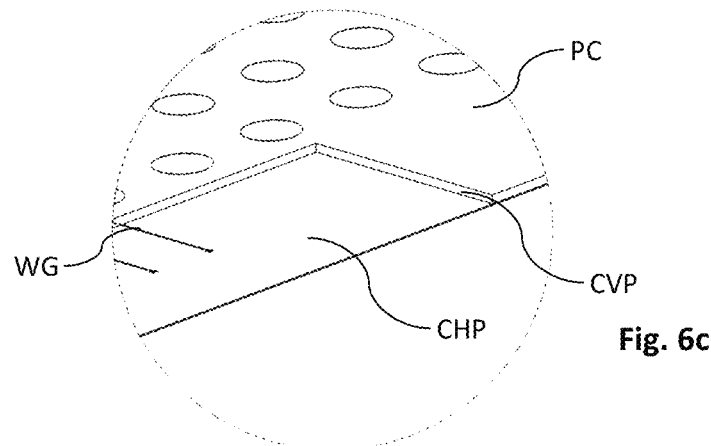

FIGS. 6a, 6b, 6c illustrate another embodiment, where the optical adapter OA can for instance be the same as described earlier in reference to FIG. 3. They are detail views of a photonic chip PC as represented in FIG. 1.

FIG. 6a shows a trench T which has a different shape, compared to FIG. 5, adapted to the shape and function of the optical adapter OA. In FIG. 6b, the optical adapter OA is put in place inside the trench T.

FIG. 6c is a magnified view, where the horizontal surface CHP and vertical surfaces CVP are visible.

As described earlier, the horizontal surface of the optical adapter OA can be put in contact with the horizontal surface CHP and the vertical surface of the optical adapter OA put in contact with the vertical surface CVP of the photonic chip PC. In this way, the optical elements OE can be precisely aligned with the waveguide WG, with similar accuracy as in previous embodiments. This enables optical out-of-plane coupling of the waveguides WG with the optical elements OE.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of distinct embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other arrangements of waveguide facets can be considered such as suspended waveguide-ends by substrate removal. Other fabrication processes than silicon-on-insulator technology can be contemplated, such as III-V photonics co-integrated on SOI layer stack.

The invention claimed is:

1. A method for aligning optical elements of an optical adaptor according to with waveguides of a photonic chip, the optical adaptor monolithically integrating optical elements and first micro-mechanical features, the latter defining at least a first horizontal reference surface and a first vertical reference surface, wherein the first horizontal reference surface is perpendicular to an optical plane, the latter being perpendicular the optical axis of the optical elements, and the first vertical reference surface is perpendicular to the first horizontal reference surface and parallel to the optical axis, the method comprising:

putting in contact the first horizontal reference surface and the first vertical reference surface with corresponding second horizontal surface and second vertical surface of the photonic chip, wherein a first distance between the first horizontal reference surface and a reference point associated with the optical element is equal to a second distance between the second horizontal reference surface and a corresponding reference point associated with the waveguide, and wherein, a third distance between the first vertical reference surface and the reference point is equal to a fourth distance between the second vertical reference surface and the corresponding reference point, and wherein putting in contact comprises:

setting the first distance equal to the second distance, and setting the third distance equal to the fourth distance.

2. The method of claim 1, wherein the photonic chip comprises waveguides having waveguide terminations at a trench of the photonic chip, and second micro-mechanical features defining at least a second horizontal reference surface and a second vertical reference surface, wherein the second horizontal reference surface is perpendicular to a second optical plane, the latter being perpendicular to a second optical axis of the waveguides, the second vertical reference surface is perpendicular to the second horizontal reference surface and parallel to the second optical axis, the first horizontal reference surface is in contact with the second horizontal reference surface and the first vertical reference surface is in contact with the second vertical reference surface, the method further comprising:

putting in contact the first horizontal reference surface with the second horizontal reference surface; and putting in contact the first vertical reference surface with the second vertical reference surface.

3. The method according to claim 1, wherein the photonic chip is fabricated according to silicon-on-insulator (SOI) technology, wherein a silicon-on-insulator layer stack is obtained.

4. The method according to claim 3, wherein a second micro-mechanical features are fabricated by etching processes selectively ending at interfaces between surfaces of the silicon on insulator layer stack.

5. A method for aligning optical elements of an optical adaptor according to with waveguides of a photonic chip, the optical adaptor monolithically integrating optical elements and first micro-mechanical features, the latter defining at least a first horizontal reference surface and a first vertical reference surface, wherein the first horizontal reference surface is perpendicular to an optical plane, the latter being perpendicular the optical axis of the optical elements, and the first vertical reference surface is perpendicular to the first horizontal reference surface and parallel to the optical axis, the method comprising:

putting in contact the first horizontal reference surface and the first vertical reference surface with corresponding second horizontal surface and second vertical surface of the photonic chip, wherein the photonic chip comprises waveguides having waveguide terminations at a trench of the photonic chip, and second micro-mechanical features defining at least a second horizontal reference surface and a second vertical reference surface, wherein the second horizontal reference surface is perpendicular to a second optical plane, the latter being perpendicular to a second optical axis of the waveguides, the second vertical reference surface is perpendicular to the second horizontal reference surface and parallel to the second optical axis, the first horizontal reference surface is in contact with the second horizontal reference surface and the first vertical reference surface is in contact with the second vertical reference surface, the method further comprising:

putting in contact the first horizontal reference surface with the second horizontal reference surface; and putting in contact the first vertical reference surface with the second vertical reference surface.

* * * * *